UNITED STATES PATENT OFFICE.

LOTTIE W. TRENT, OF DENVER, COLORADO.

REMEDIAL COSMETIC.

SPECIFICATION forming part of Letters Patent No. 444,411, dated January 6, 1891.

Application filed November 24, 1890. Serial No. 372,549. (No specimens.)

*To all whom it may concern:*

Be it known that I, LOTTIE W. TRENT, a citizen of the United States of America, residing at Denver, in the county of Arapahoe and State of Colorado, have invented certain new and useful Improvements in Remedial Cosmetics; and I do declare the following to be a full, clear, and exact description of the invention, such as will enable others skilled in the art to which it appertains to make and use the same.

My invention relates to a new and useful composition of matter for use as a cosmetic, lotion, or wash, and possessing therapeutic qualities, fitting and adapting it for employment not only as a mere cosmetic for preserving and softening the skin, but also for use as a healing or remedial application in removing pimples, rash, &c.

My compound consists of Rochelle salt, ($KNaC_4H_4O_6+4H_2O$,) water, and benzoin, combined in proportions varying according to the desired strength of the mixture. For instance, a table-spoonful of the salt to a quart of water and two tea-spoonsful of benzoin form a compound of moderate strength, while a less quantity of the salt and the benzoin will obviously make the mixture weaker, while a greater quantity of these ingredients will make it correspondingly stronger, the quantity of water in each case remaining the same. It is believed that the proportions of the salt and benzoin given are preferable. Hence when the one of these ingredients is increased or diminished, the other should be proportionately greater or less.

In compounding the ingredients named I dissolve the Rochelle salt in the water heated to the boiling-point. This solution is then allowed to cool, when the benzoin is added, and also a few drops of oil of rose or other suitable perfume, when the lotion is ready for use.

The compound is to be applied by rubbing upon the surface of the skin.

Having thus described my invention, what I claim is—

The herein-described composition of matter for use as a remedial cosmetic, consisting of Rochelle salt, water, and benzoin, combined substantially in the proportions specified.

In testimony whereof I affix my signature in presence of two witnesses.

LOTTIE W. TRENT.

Witnesses:
  WM. MCCONNELL,
  FRED. W. FELDWISCH.